United States Patent
Jo (10) Patent No.: US 10,243,923 B2
(45) Date of Patent: Mar. 26, 2019

(54) METHOD AND SYSTEM FOR ALLOCATING COMMUNICATION ID OF BATTERY MANAGEMENT MODULE

(71) Applicant: LG CHEM, LTD., Seoul (KR)

(72) Inventor: Yong-Min Jo, Daejeon (KR)

(73) Assignee: LG CHEM, LTD., Seoul (KR)

(*) Notice: Subject to any disclaimer, the term of this patent is extended or adjusted under 35 U.S.C. 154(b) by 286 days.

(21) Appl. No.: 15/502,282

(22) PCT Filed: Oct. 7, 2015

(86) PCT No.: PCT/KR2015/010617
§ 371 (c)(1),
(2) Date: Feb. 7, 2017

(87) PCT Pub. No.: WO2016/056845
PCT Pub. Date: Apr. 14, 2016

(65) Prior Publication Data
US 2017/0237707 A1    Aug. 17, 2017

(30) Foreign Application Priority Data

Oct. 7, 2014 (KR) .................. 10-2014-0134850

(51) Int. Cl.
*G06F 15/16* (2006.01)
*H04L 29/12* (2006.01)
(Continued)

(52) U.S. Cl.
CPC ...... *H04L 61/6027* (2013.01); *G06F 13/4068* (2013.01); *G06F 13/4247* (2013.01);
(Continued)

(58) Field of Classification Search
CPC .................................................. H04L 61/6027
(Continued)

(56) References Cited

U.S. PATENT DOCUMENTS 7,453,236 B2 * 11/2008 Eguchi .................. G06F 1/263
320/116
8,912,758 B2   12/2014 Kang et al.
(Continued)

FOREIGN PATENT DOCUMENTS

EP    1 326 172 A2    7/2003
EP    2416529 A1      2/2012
(Continued)

OTHER PUBLICATIONS

International Search Report, issued in PCT/KR2015/010617 (PCT/ISA/210), dated Feb. 5, 2016.

*Primary Examiner* — Hamza N Algibhah
(74) *Attorney, Agent, or Firm* — Birch, Stewart, Kolasch & Birch, LLP (57) ABSTRACT

The present disclosure relates to a communication ID allocation method and system of a battery management module. The system according to the present disclosure includes a first to nth battery management modules sequentially connected through a communication interface, wherein each battery management module designates itself as a master module or a slave module depending on whether or not a pulse signal is received from a battery management module at a higher level, and each battery management module allocates its communication ID according to a pulse width of the pulse signal received from the battery management module at a higher level, generates a pulse signal having the pulse width corresponding to the communication ID of the battery management module at a lower level, and outputs the generated pulse signal to the battery management module at a lower level.

17 Claims, 6 Drawing Sheets

(51) Int. Cl.
  *H04L 12/28* (2006.01)
  *H04L 12/24* (2006.01)
  *G06F 13/40* (2006.01)
  *G06F 13/42* (2006.01)
  *H04L 25/49* (2006.01)
  *H04L 12/40* (2006.01)

(52) U.S. Cl.
  CPC .......... *H04L 12/28* (2013.01); *H04L 25/4902* (2013.01); *H04L 41/00* (2013.01); *H04L 2012/40215* (2013.01); *H04L 2012/40273* (2013.01)

(58) Field of Classification Search
  USPC .......................................................... 709/245
  See application file for complete search history.

(56) References Cited

U.S. PATENT DOCUMENTS

| | | | |
|---|---|---|---|
| 9,582,452 B2 * | 2/2017 | Ray | G06F 13/4068 |
| 2003/0145036 A1 | 7/2003 | Hartmann et al. | |
| 2007/0182549 A1 * | 8/2007 | Qi | H04Q 9/00 340/539.26 |
| 2007/0282518 A1 * | 12/2007 | Labitzke | H02J 7/1446 701/115 |
| 2008/0301344 A1 | 12/2008 | Hsieh | |
| 2009/0292485 A1 | 11/2009 | Van Gorp et al. | |
| 2010/0295382 A1 * | 11/2010 | Tae | G01R 31/3658 307/150 |
| 2011/0082955 A1 | 4/2011 | Wortham et al. | |
| 2011/0175574 A1 * | 7/2011 | Sim | H01M 10/425 320/121 |
| 2011/0208886 A1 | 8/2011 | Sugiura et al. | |
| 2012/0228946 A1 * | 9/2012 | Sim | H01M 2/024 307/80 |
| 2012/0307839 A1 | 12/2012 | Ionescu et al. | |
| 2012/0321934 A1 * | 12/2012 | Hopkins | B60K 6/28 429/151 |
| 2014/0078950 A1 | 3/2014 | Jung | |
| 2015/0084598 A1 * | 3/2015 | Song | H02J 7/0021 320/128 |

FOREIGN PATENT DOCUMENTS

| | | |
|---|---|---|
| JP | 2005-217945 A | 8/2005 |
| KR | 10-2004-0072426 A | 8/2004 |
| KR | 10-2012-0134059 A | 12/2012 |
| KR | 10-2014-0038254 A | 3/2014 |
| KR | 10-2014-0108384 A | 9/2014 |

* cited by examiner

METHOD AND SYSTEM FOR ALLOCATING COMMUNICATION ID OF BATTERY MANAGEMENT MODULE

TECHNICAL FIELD

The present application claims priority to Korean Patent Application No. 10-2014-0134850 filed on Oct. 7, 2014, the disclosure of which is incorporated herein by reference.

The present disclosure relates to a method and system for allocating a communication ID of a hardware module that is in charge of overall management of battery.

BACKGROUND ART

In an electric vehicle (EV), a hybrid vehicle (HV), an electric storage system (ESS) and the like, a high-capacity battery pack is loaded.

The high-capacity battery pack has a multi-module structure where a battery module including a plurality of unit cells is connected in series and/or in parallel to one another.

In the multi-module structure, each battery module is operably coupled with a battery management module that is a type of control device capable of performing computing operations.

In the related art, the battery management module is called a battery management system (BMS). BMS is in charge of measuring electrical characteristic values such as the voltage/current/temperature and the like of a unit cell, controlling charge/discharge, controlling equalization of voltage, and estimating a state of charge (SOC) and a state of health (SOH), etc.

When the high-capacity battery pack has a multi-module structure, the plurality of battery management modules may be categorized into modules having different roles: a master module, and slave modules that are subordinate to the master module.

The master module is connected to each slave module such that it may communicate with the slave module, and takes the role of monitoring and controlling each slave module. Further, the master module transmits, to an external integrated control device, information such as operational characteristics values such as the voltage, current, temperature and the like, and a state of charge and the like collected from each slave module. Further, when a safety problem occurs in a certain battery module, the master module controls the corresponding slave module, thereby restricting usage of the battery module according to a predetermined manual. Further, the master module updates a control algorithm of the slave modules, and distributes a target value of a parameter subject to control or restriction.

Meanwhile, in order for the master module to communicate with each slave module, each module must be allocated with a unique communication ID. A communication ID is a type of identification information for distinguishing between a master module and a slave module in a communication network.

Conventional methods used for allocating a communication ID of a battery management module either store ID information in a separate circuit or enable the master module to generate a communication ID for each slave module based on a complicated software algorithm and distribute the generated communication ID to each slave module through a communication network.

However, the former method has a disadvantage that a separate circuit has to be designed for the communication ID allocation, and that once the communication ID is allocated, it cannot be easily changed.

Further, the latter method has a disadvantage that it requires a complicated software algorithm, and that in case of replacing a slave module, the entire system must be initiated once again in order to reset the communication ID.

Therefore, in the technical field of the present disclosure, an improved communication ID allocation method is required where allocating a communication ID is simple, and where a communication ID can be re-allocated even without stopping the system in case of replacing the slave module.

DISCLOSURE

Technical Problem

The present disclosure was conceived against the backdrop of the prior art mentioned above, and its purpose lies in providing a method and system for allocating a communication ID of a master module and a slave module in a simple way.

Another purpose of the present disclosure lies in providing a method and system for allocating a communication ID without having to stop the system even when a master module or a slave module is replaced.

TECHNICAL SOLUTION

According to an embodiment of the present disclosure, there is provided a battery management system including a first to nth battery management modules sequentially connected through a communication interface, wherein each battery management module designates itself as a master module or a slave module depending on whether or not a pulse signal is received from a battery management module at a higher level, and each battery management module allocates its communication ID according to a pulse width of the pulse signal received from the battery management module at a higher level, generates a pulse signal having the pulse width corresponding to the communication ID of the battery management module at a lower level, and outputs the generated pulse signal to the battery management module at a lower level.

Preferably, the battery management module may designate itself as the master module if the pulse signal is not input through the communication interface.

According to one aspect, each battery management module may include a storage where an ID look-up table that may be referred to for a pulse width corresponding to each communication ID is recorded.

According to another aspect, each battery management module may generate a pulse signal having a pulse width that is greater than that of the pulse signal that it received and output the generated pulse signal to the battery management module at a lower level.

According to another aspect, each battery management module may recognize that the battery management module at a lower level is replaced, generate a pulse signal corresponding to the communication ID of the replaced battery management module and output the generated pulse signal.

Preferably, the communication interface may be a controller area network (CAN) communication interface or a daisy chain communication interface.

According to another embodiment of the present disclosure, there is provided a battery management module including a communication interface that enables transmitting and receiving of data signals; a signal receiver that receives a pulse signal through the communication interface; a signal transmitter that outputs a pulse signal through the communication interface; and a controller that receives a pulse signal through the signal receiver, allocates a communication ID according to a pulse width of the received pulse signal, generates a pulse signal having a pulse width corresponding to a communication ID different from the allocated communication ID, and outputs the generated pulse signal to the communication interface through the signal transmitter.

Preferably, the controller may designate the battery management module as a master module if the pulse signal is not received through the signal receiver, and designate the battery management module as a slave module if the pulse signal is received through the signal receiver.

According to one aspect, the battery management module according to the present disclosure may further include a storage electrically coupled to the controller, and the storage may include an ID look-up table referred to for a pulse width corresponding to each communication ID.

According to another aspect, the controller may generate a pulse signal having a greater pulse width than the pulse signal received through the signal receiver and output the generated pulse signal to the communication interface through the signal transmitter.

According to an embodiment of the present disclosure, there is provided a method for allocating a communication ID of each battery management module in a battery management system including a first to nth battery management modules sequentially connected through a communication interface, the method including: (a) recognizing that a pulse signal is not received through the communication interface and setting itself as a master module, by the first battery management module; (b) generating a pulse signal having a pulse width corresponding to a communication ID of the second battery management module and outputting the generated pulse signal to the second battery management module through the communication interface, by the first battery management module; and (c) by the kth battery management module (2≤k≤n−1, k is a natural number), receiving a pulse signal from a battery management module at a higher level through the communication interface, allocating its communication ID to correspond to the pulse width of the received pulse signal, and generating a pulse signal having the pulse width corresponding to the communication ID of the battery management module at a lower level and outputting the generated pulse signal through the communication interface.

According to another embodiment of the present disclosure, there is provided a method for controlling a battery management module, the method including receiving a pulse signal through the communication interface; allocating a communication ID according to a pulse width of the received pulse signal; generating a pulse signal having a pulse width corresponding to a communication ID different from the allocated communication ID; and outputting the generated pulse signal through the communication interface.

Advantageous Effects

The present disclosure gives the following effects. According to an aspect of the present disclosure, it is possible to allocate a communication ID of a master module and a slave module in a battery management system having a multi-module structure in a simple way.

According to another aspect of the present disclosure, it is possible to allocate a communication ID without having to stop the system even when a master module or a slave module is replaced.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

Figure 1:
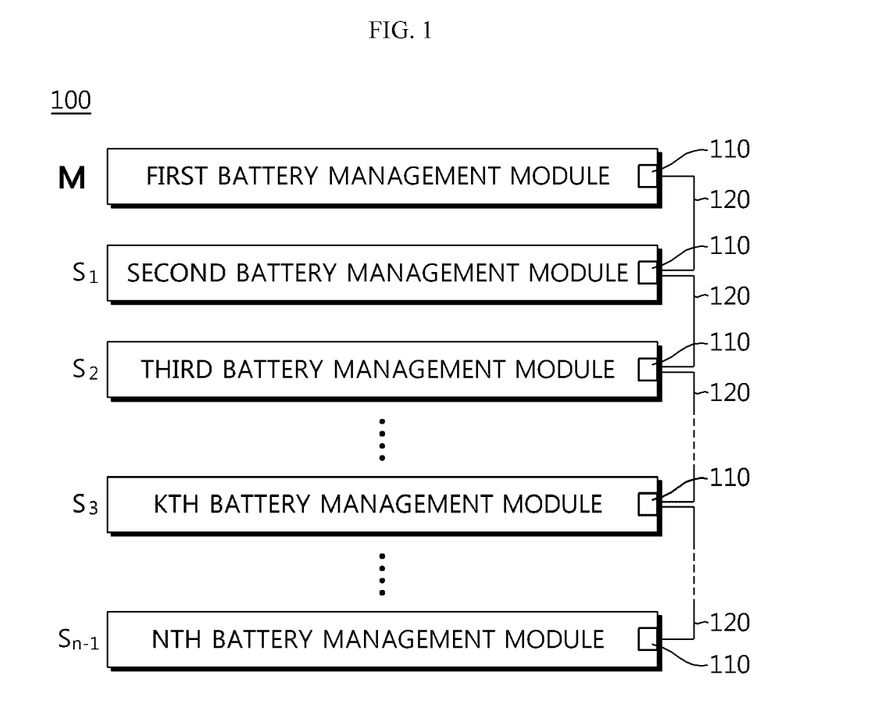
FIG. 1 is a block diagram illustrating a configuration of a battery management system according to an embodiment of the present disclosure.

FIG. 1 is a schematic configurative view of a battery management system where a first to nth battery management modules are connected sequentially through a serial communication interface according to an embodiment of the present disclosure.

Referring to FIG. 1, the battery management system 100 according the present disclosure includes a first to nth battery management modules M, $S_1$ to $S_{n-1}$ to connected sequentially through the communication interface 110.

Each battery management module M, $S_1$ to $S_{n-1}$ may be electrically connected with a battery module (not illustrated) including a plurality of unit cells and may perform various functions known in the related art to be performed by BMS such as monitoring operational characteristic values such as the voltage and temperature of a unit cell and a charge/ discharge current magnitude of the battery module, estimating a state of charge (SOC) of a unit cell and equalizing the same, and protecting a unit cell from situations such as over-charge, over-discharge, over-current, over-heating and the like.

Preferably, the communication interface 110 may be a daisy chain communication interface capable of relaying data communication between adjacent battery management modules, or a CAN communication interface capable of relaying data communication between arbitrary battery management modules.

In the former case, a communication interface 110 that is adjacent in up and down direction may be connected through a communication line 120. In the latter case, the communication interface 110 may be connected to a communication line (not illustrated) that configures the CAN communication network.

The battery management system 100 according to the present disclosure allocates a communication ID of each battery management module M, $S_1$ to $S_{n-1}$ using a pulse width of a pulse signal.

More specifically, each battery management module M, $S_1$ to $S_{n-1}$ determines whether or not a pulse signal is received from a battery management module at a higher level through the communication interface 110, and designates itself as a master module or a slave module accordingly.

Further, each battery management module M, $S_1$ to $S_{n-1}$ allocates its communication ID according to the pulse width of the pulse signal received from the battery management module at a higher level through the communication interface 110, generates a pulse signal having a pulse width corresponding to the communication ID of a battery management module at a lower level, and outputs the generated pulse signal to the battery management module at a lower level through the communication interface 110.

Figure 2:
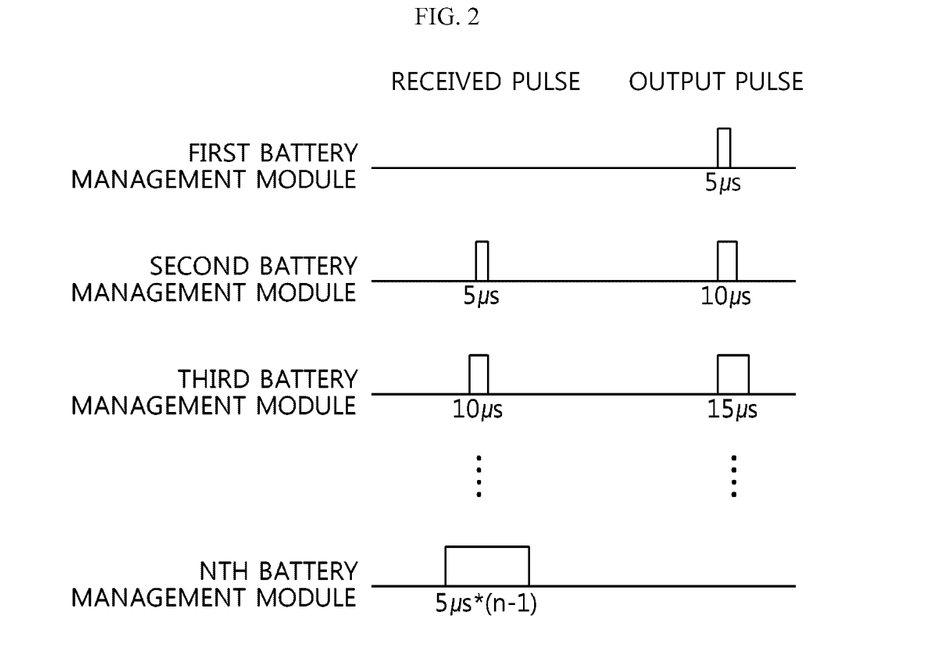
FIG. 2 is a signal waveform view exemplifying a pulse signal that a first to nth battery management modules of FIG. 1 receive or output.
Figure 3:
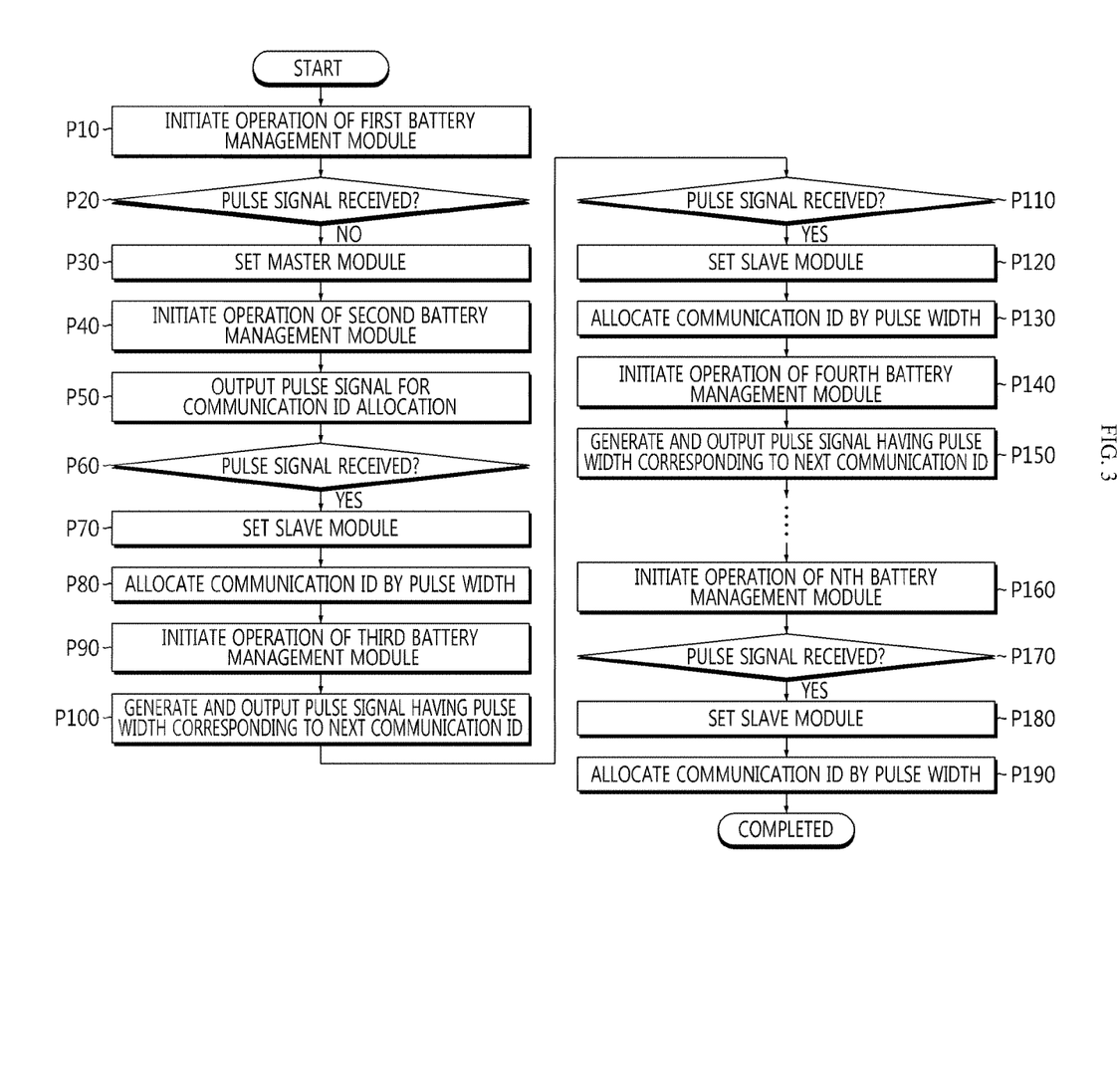
FIG. 3 is a flowchart illustrating a communication ID allocation method of a battery management system according to an embodiment of the present disclosure.

FIG. 2 is a signal waveform diagram illustrating the pulse signal received or output by the first to nth battery management modules M, $S_1$ to $S_{n-1}$ illustrated in FIG. 1, and FIG. 3 is a flowchart illustrating a method where the first to nth battery management modules M, $S_1$ to $S_{n-1}$ allocate a unique communication ID in a battery management system according to the present disclosure.

Hereinbelow, the communication ID allocation method according to the present disclosure will be explained with reference to FIGS. 2 and 3.

First, when the battery management system 100 starts operation, the first battery management module M initiates operation (step P10). Then, the first battery management module M monitors whether or not a pulse signal is received through the communication interface 110 (step P20). However, since the first battery management module M is disposed at the highest level, the first battery management module M cannot receive a pulse signal at step P20. Therefore, the first battery management module M sets itself as a master module (step P30). Then, the first battery management module M initiates operation of the second battery management module $S_1$ that is at a lower level by outputting an initiating signal through the communication interface 110 (step P40), and generates a pulse signal having a pulse width 5 us corresponding to the communication ID of the second battery management module $S_1$ and outputs the generated pulse signal through the communication interface 110 (step P50). Then, the pulse signal is input through the communication interface 110 of the second battery management module $S_1$.

Next, the second battery management module $S_1$ monitors whether or not a pulse signal is received through the communication interface 110 after it is initiated at step P40 (step P60). Here, since at step P50, the pulse signal is input through the communication interface 110 of the second battery management module $S_1$, the second battery management module $S_1$ takes the process to step P70 and sets itself as the slave module. Then, the second battery management module $S_1$ allocates a communication ID (example: 1) corresponding to the pulse width 5 us of the received pulse signal (step P80). Then, the second battery management module $S_1$ outputs an initiating signal through the communication interface 110 and initiates operation of the third battery management module $S_2$ that is at a lower level (step P90). Then, the second battery management module $S_1$ generates a pulse signal having the pulse width 10 us corresponding to the communication ID (example: 2) of the third battery management module $S_2$ at a lower level and outputs the generated pulse signal through the communication interface 110 (step P100).

Here, the pulse width of the pulse signal generated at step P100 is greater than the pulse width of the pulse signal received at step P60. Further, the pulse signal generated at step P100 is input through the communication interface 110 of the third battery management module $S_2$.

Next, the third battery management module $S_2$ monitors whether or not a pulse signal is received through the communication interface 110 after it is initiated at step P90 (step P110). Here, since at step P100 the pulse signal is input through the communication interface 110 of the third battery management module $S_2$, the third battery management module $S_2$ takes the process to step P120 and sets itself as the slave module. Then, the third battery management module $S_2$ allocates a communication ID (for example: 2) corresponding to the pulse width 10 us of the received pulse signal (step P130). Then, the third battery management module $S_2$ outputs an initiating signal through the communication interface 110 and initiates operation of the fourth battery management module (not illustrated) that is at a lower level (step P140). Then, the third battery management module $S_2$ generates a pulse signal having the pulse width 15 us corresponding to the communication ID (for example: 3) of the fourth battery management module that is at a lower level, and outputs the generated pulse signal through the communication interface 110.

Here, the pulse width of the pulse signal generated at step P150 is greater than the pulse width of the pulse signal received at step P110. Further, the pulse signal generated at step P150 is input through the communication interface 110 of the fourth battery management module $S_3$.

The aforementioned communication ID allocation process is repeated until the nth battery management module $S_{n-1}$ allocates a communication ID.

That is, the nth battery management module $S_{n-1}$ monitors whether or not a pulse signal is received through the communication interface 110 after it is initiated by the n-1 th battery management module $S_{n-2}$ at step P160 (step P170). If the pulse signal is input, the nth battery management module $S_{n-1}$ takes the process to step P180 and sets itself as the slave module (step P180). Then, the nth battery management module $S_{n-1}$ allocates a communication ID (for example: n-1) corresponding to the pulse width 5 us*(n-1) of the received pulse signal (step P190).

Preferably, the battery management modules $S_1$ to $S_{n-1}$ set as slave modules may transmit an ID allocation complete signal to the first battery management module M set as the master module or a battery management module at a higher level through the communication interface 110 after allocating their communication IDs.

Further, the battery management modules $S_1$ to $S_{n-1}$ set as the slave modules may transmit an initiation complete signal to the first battery management module M set as the master module or the battery management module at a higher level through the communication interface 110 after completing their initiation of operation.

Next, the configuration of the battery management module according to an embodiment of the present disclosure will be explained specifically with reference to FIG. 4.

Figure 4:
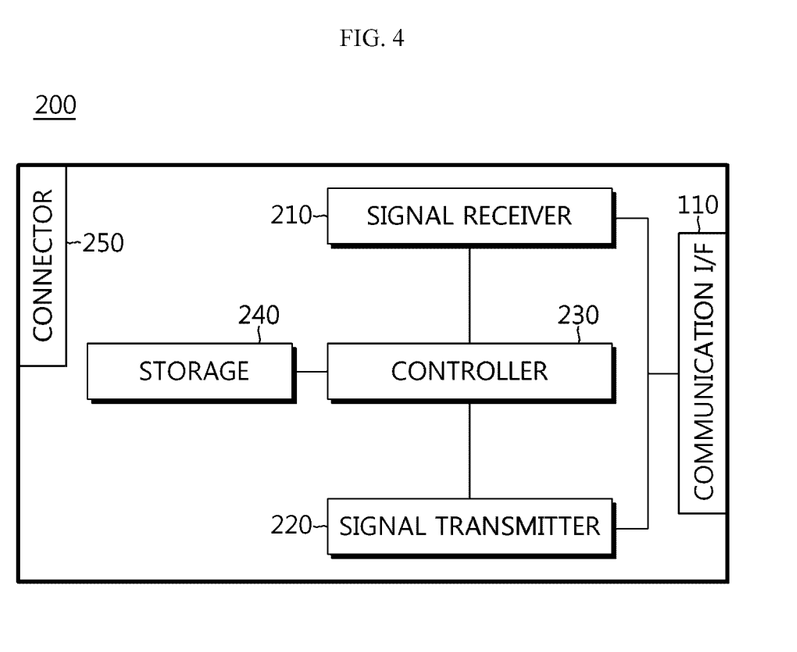
FIG. 4 is a block diagram illustrating a configuration of a battery management module according to an embodiment of the present disclosure.

FIG. 4 is a block diagram illustrating the configuration of the battery management module according to an embodiment of the present disclosure.

As illustrated in FIG. 4, the battery management module 200 according to the present disclosure includes the communication interface 110, a signal receiver 210, a signal transmitter 220, a controller 230, a storage 240 and a connector 250.

The signal receiver 210 receives a data signal through the communication interface 110 and transmits the received data signal to the controller 230. Further, the signal transmitter 220 outputs the data signal generated by the controller 230 to outside through the communication interface 110.

Here, the data signal includes a pulse signal used in the communication ID allocation, an initiating signal, an initiation complete signal, an ID allocation complete signal, a communication ID and the like.

The storage 240 includes an ID look-up table where a communication ID may be mapped by a pulse width.

Preferably, the ID look-up table may have a data structure where a pulse width may be mapped by communication IDs that are given certain numbers in order. The ID look-up table may be used to decide the corresponding communication ID using the pulse width, or on the contrary, to decide the corresponding pulse width using the communication ID.

In one example, the storage 240 may be RAM, ROM, register, hard disk, optical recording medium or magnetic recording medium.

Preferably, the storage 240 may be connected with the controller 230 via, for example, data bus and the like to allow access by the controller 230.

The storage 240 stores and/or updates and/or erases and/or transmits programs that include various control logics that the controller 230 perform, and/or data generated when the control logics are implemented.

The storage 240 may be logically divided into two or more storages, and the storage 240 is not limited to being included in the controller 230.

When a pulse signal is received through the signal receiver 210, the controller 230 calculates the pulse width of the corresponding signal, looks up the communication ID corresponding to the calculated pulse width with reference to the ID look-up table, and allocates the looked-up communication ID as the communication ID of the battery management module 200.

After allocating the communication ID, the controller 230 also identifies the pulse width corresponding to the communication ID that comes next in order with reference to the ID look-up table, generates a pulse signal having the identified pulse width and outputs the generated pulse signal to the signal transmitter 220. Then, the signal transmitter 220 outputs the generated pulse signal to outside through the communication interface 110.

Meanwhile, the controller 230 may allocate the communication ID corresponding to the pulse width according to a predetermined rule. For example, the quotient of the pulse width divided by a reference pulse width may be allocated as the communication ID. Further, the controller 230 may calculate the pulse width corresponding to the communication ID that comes next in order under the predetermined rule. For example, the controller 230 may add one to the communication ID allocated at the current time point, multiply the reference pulse width therewith and determine the result value as the pulse width corresponding to the next communication ID. In this example, utilizing the ID look-up table may be omitted.

The connector 250 may be electrically coupled to a battery module that includes a plurality of unit cells. The connector 250 has a well-known structure used in the related art to couple a battery module and a BMS. Therefore, detailed explanation on the connector 250 will be omitted. The unit cell may be a lithium polymer battery, but the present disclosure is not limited to a specific type of unit cell.

The controller 230 may measure an operational characteristic value such as the voltage and the temperature of each unit cell through the connector 250, measure a charge/discharge current, and control charge and discharge of each unit cell.

In order to implement a variety of control logics including those described above, the controller 230 may optionally include processor, application-specific integrated circuit (ASIC), other chipsets, logic circuit, register, communication modem, data processor, and the like, as known in the art.

Further, when the control logic is implemented as software, the controller 230 may be implemented as a set of program modules. In this case, the program modules may be stored in a memory and executed by a processor. The memory may be internal or external to the processor and may be connected with the processor with a variety of well-known computer components. Further, the memory may be included in the storage 240 of the present disclosure. Further, the 'memory' collectively refers to any type of devices where information is stored, and is not intended to refer to any specific memory device.

Next, a method for controlling a battery management module according to an embodiment of the present disclosure will be explained with reference to FIG. 5.

First, the controller 230 monitors whether or not an initiating signal is received (step S10). If the initiating signal is received, the controller 230 initiates operation of the battery management module that it takes control thereof (step S20).

Then, the controller 230 monitors whether or not a pulse signal is received through the communication interface 110 (step S30). If the pulse signal is not received, the controller 230 sets the battery management module as the master module (step S40). On the contrary, if the pulse signal is received, the controller 230 sets the battery management module as the slave module (step S50).

When the battery management module is set as the master module, the controller 230 takes the process to step S60 and outputs an initiating signal for initiating operation of the battery management module at a lower level through the communication interface 110.

Then, the controller 230 monitors whether or not an initiation complete signal is received from the battery management module at a lower level (step S70). If the initiation complete signal is received, the controller 230 determines a pulse width corresponding to the communication ID to be allocated for the battery management module at a lower level in the aforementioned method, generates a pulse signal having the determined pulse width, and outputs the generated pulse signal through the communication interface 110 (step S80).

Then, the controller 230 monitors whether or not an ID allocation complete signal is received from the battery management module at a lower level (step S90), and if the ID allocation complete signal is received, ends the process.

Meanwhile, when the battery management module is set as the slave module, the controller 230 takes the process to step S100 and calculates the pulse width of the pulse signal received through the communication interface 110, and allocates its communication ID according to the pulse width calculated by the aforementioned method (step S100).

Then, the controller 230 outputs an initiating signal for initiating operation of the battery management module at a lower level through the communication interface 110 (step S110).

Then, the controller 230 monitors whether or not the initiation complete signal is received from the battery management module at a lower level through the communication interface 110 (step S120). If the initiation complete signal is received, the controller 230 determines the pulse width corresponding to the next communication ID to be allocated for the battery management module at a lower level in the aforementioned method, generates a pulse signal having the determined pulse width, and outputs the generated pulse signal through the communication interface 110 (step S130).

Then, the controller 230 monitors whether or not an ID allocation complete signal is received from the battery management module at a lower level (step S140), and if the ID allocation complete signal is received, ends the process.

The battery management system according to the present disclosure has an advantage that the entire system need not be initiated again when a certain battery management module is replaced.

Figure 6:
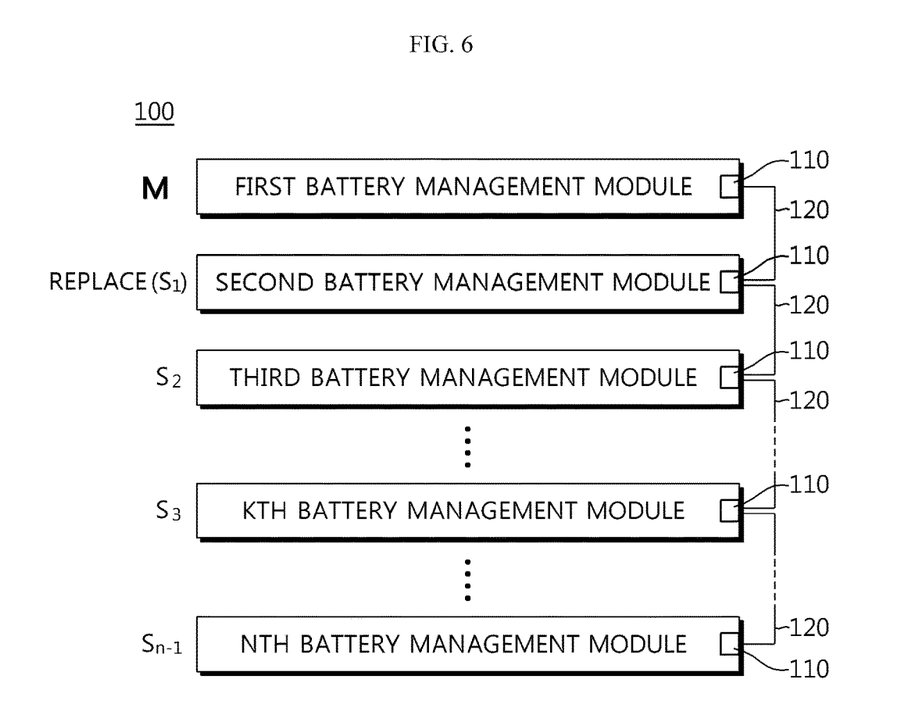
FIG. 6 is a view provided to explain a process of re-allocating a communication ID when a certain battery management module is replaced in a battery management system according to an embodiment of the present disclosure.

FIG. 6 shows a process of replacing the second battery management module $S_1$ without re-initiating the system in the battery management system according to the present disclosure.

Each battery management module included in the battery management system 100 according to the present disclosure periodically checks the state of communication with other battery management modules. Therefore, if the second battery management module $S_1$ is removed from the system 100, the first battery management module M and the third battery management module $S_2$ recognize that communication with the second battery management module $S_1$ is not possible. Then, the first battery management module M and the third battery management module $S_2$ stop communication with the second battery management module $S_1$ and go into a standby mode.

In this state, if a new second battery management module $S_1$ is mounted onto the system 100, the first battery management module M at a higher level recognizes that a new second battery management module $S_1$ is mounted. For example, in the process where the new second battery management module $S_1$ is being mounted, the first battery management module M and the second battery management module $S_1$ are newly connected by the communication line 120. Here, the controller included in the first battery management module M may recognize a voltage variation between the ground and a terminal to which the communication line 120 is connected to identify that the second battery management module $S_1$ is newly replaced.

Then, the first battery management module M transmits an initiating signal to the newly mounted second battery management module $S_1$ through the communication interface 110 and initiates operation of the second battery management module $S_1$. Then, the first battery management module M transmits a pulse signal having the pulse width corresponding to the communication ID of the second battery management module $S_1$ to the second battery management module $S_1$ according to the method explained above.

Then, the second battery management module $S_1$ receives the pulse signal and then sets itself as the slave module, and allocates its communication ID using the pulse width of the received pulse signal. Then, an ID allocation complete signal is transmitted to the first battery management module M.

Meanwhile, since the third battery management module $S_2$ has already allocated its communication ID, the second battery management module $S_1$ doesn't have to generate and output the pulse signal for the communication ID that comes next in order.

Optionally, the second battery management module $S_1$ may generate and output once again the pulse signal for allocation of the communication ID that comes next in order. In this case, the third to nth battery management modules $S_2$ to $S_{n-1}$ may repeat once again the process of allocating the communication ID as explained above.

Figure 5:
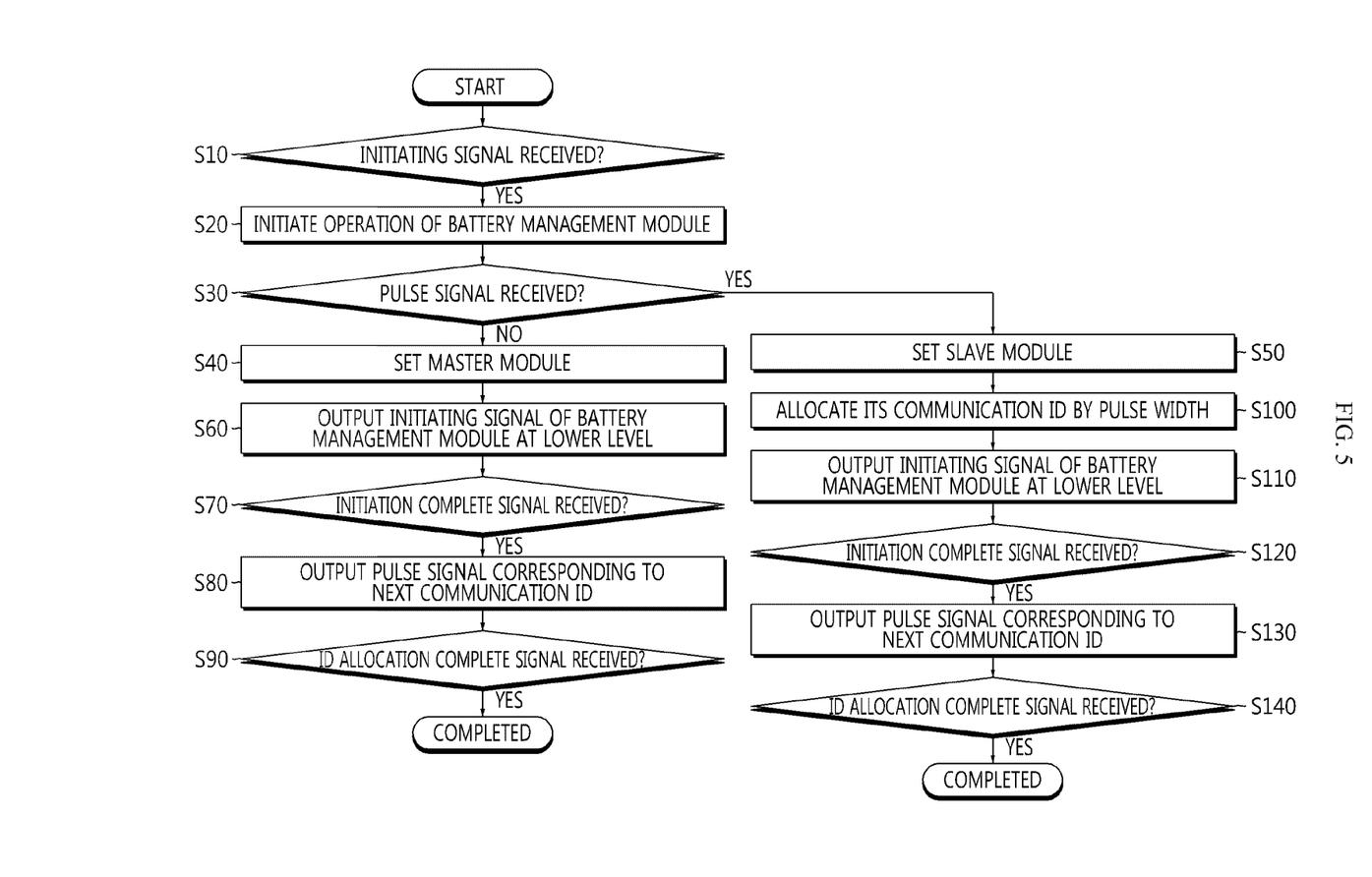
FIG. 5 is a flowchart illustrating a method for controlling a battery management module according to an embodiment of the present disclosure.

In the present disclosure one or more of the control logics exemplified in FIGS. 3 and 5 may be combined, and the combined control logics may be written by computer-readable codes and recorded on a computer-readable recording medium. The recording medium is not limited to any specific type, as long as it is accessible by a processor included in the computer. In one example, the recording medium may include at least one selected from the group consisting of ROM, RAM, register, CD-ROM, magnetic tape, hard disk, floppy disk, and optical data recording device. Further, the codes may be modulated into carrier signals and included in the communication carriers at a specific time point, and distributed over a networked computer and stored and executed therein. Further, programmers in the technical field pertinent to the present disclosure will be easily able to envision functional programs, codes and code segments to implement the combined control logics.

In describing a variety of aspects of the present disclosure, the elements with names ending with '~er' will have to be understood as the elements that are distinguished functionally, rather than being distinguished physically. Accordingly, the respective elements may be optionally incorporated with another element, or each of the elements may be divided into sub-elements such that the respective elements efficiently implement control logic(s). However, even when the elements are incorporated or divided, it will be obvious to those skilled in the art that the incorporated or divided elements also fall under the scope of the present disclosure, as long as the sameness of functions is acknowledged.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

INDUSTRIAL APPLICABILITY

According to one aspect of the present disclosure, in a battery management system having a multi-module structure, a communication ID of a master module and a slave module may be allocated in a simple way.

According to another aspect of the present disclosure, even when there is a replacement of master module or a slave module, the communication ID may be allocated without stopping the system.

What is claimed is:

1. A battery management system comprising:
 a first to nth battery management modules sequentially connected through a communication interface,
 wherein each battery management module designates itself as a master module or a slave module depending on whether or not a pulse signal is received from a battery management module at a higher level, and
 each battery management module allocates its communication ID according to a pulse width of the pulse signal received from the battery management module at a higher level, generates a pulse signal having the pulse width corresponding to the communication ID of the battery management module at a lower level, and outputs the generated pulse signal to the battery management module at a lower level.

2. The battery management system of claim 1, wherein each battery management module designates itself as the master module if the pulse signal is not input through the communication interface.

3. The battery management system of claim 1, wherein each battery management module comprises a storage where an ID look-up table referred to for a pulse width corresponding to each communication ID is recorded.

4. The battery management system of claim 1, wherein each battery management module generates a pulse signal having a pulse width that is greater than that of the pulse signal that it received and outputs the generated pulse signal to the battery management module at a lower level.

5. The battery management system of claim 1, wherein each battery management module recognizes that the battery management module at a lower level is replaced, generates a pulse signal corresponding to the communication ID of the replaced battery management module and outputs the generated pulse signal.

6. The battery management system of claim 1, wherein the communication interface is a CAN communication interface or a daisy chain communication interface.

7. A battery management module comprising:
 a communication interface that enables transmitting and receiving of data signals;
 a signal receiver that receives a pulse signal through the communication interface;
 a signal transmitter that outputs a pulse signal through the communication interface; and
 a controller that receives a pulse signal through the signal receiver, allocates a communication ID according to a pulse width of the received pulse signal, generates a pulse signal having a pulse width corresponding to a communication ID different from the allocated communication ID, and outputs the generated pulse signal to the communication interface through the signal transmitter.

8. The battery management module of claim 7, wherein the controller designates the battery management module as a master module if the pulse signal is not received through the signal receiver, and designates the battery management module as a slave module if the pulse signal is received through the signal receiver.

9. The battery management module of claim 7, further comprising a storage electrically coupled to the controller, wherein the storage comprises an ID look-up table referred to for a pulse width corresponding to each communication ID.

10. The battery management module of claim 7, wherein the controller generates a pulse signal having a greater pulse width than the pulse signal received through the signal receiver and outputs the generated pulse signal to the communication interface through the signal transmitter.

11. The battery management module of claim 7, wherein the communication interface is a CAN communication interface or a daisy chain communication interface.

12. A method for allocating a communication ID of each battery management module in a battery management system comprising a first to nth battery management modules sequentially connected through a communication interface, the method comprising:
 (a) recognizing that a pulse signal is not received through the communication interface and setting itself as a master module, by the first battery management module;
 (b) generating a pulse signal having a pulse width corresponding to a communication ID of the second battery management module and outputting the generated pulse signal to the second battery management module through the communication interface, by the first battery management module; and
 (c) by the kth battery management module (2≤k≤n−1, k is a natural number), receiving a pulse signal from a battery management module at a higher level through the communication interface, allocating its communication ID to correspond to the pulse width of the received pulse signal, and generating a pulse signal having the pulse width corresponding to the communication ID of the battery management module at a lower level and outputting the generated pulse signal through the communication interface.

13. The method of claim 12, wherein at step (c), the kth battery management module allocates a communication ID according to the received pulse signal by using an ID look-up table referred to for a pulse width corresponding to each communication ID.

14. The method of claim 12, wherein at step (c), the kth battery management module generates a pulse signal having a greater pulse width than the pulse signal it received and outputs the generated pulse signal to the battery management module at a lower level.

15. The method of claim 12, wherein at step (d), the kth battery management module recognizes that the battery management module at a lower level is replaced, generates a pulse signal corresponding to the communication ID of a replaced battery management module and outputs the generated pulse signal.

16. The method of claim 12, wherein the communication interface is a CAN communication interface or a daisy chain communication interface.

17. A communication ID allocation method using a communication interface, the method comprising:
 receiving a pulse signal through the communication interface;
 allocating a communication ID according to a pulse width of the received pulse signal;
 generating a pulse signal having a pulse width corresponding to a communication ID different from the allocated communication ID; and outputting the generated pulse signal through the communication interface.

\* \* \* \* \*